United States Patent [19]
Pauquette

[11] 3,771,759
[45] Nov. 13, 1973

[54] BUTTERFLY VALVE
[75] Inventor: James J. Pauquette, Clare, Mich.
[73] Assignee: Chandler Evans Inc., West Hartford, Conn.
[22] Filed: Apr. 5, 1972
[21] Appl. No.: 241,127

[52] U.S. Cl.................. 251/58, 251/305, 251/308
[51] Int. Cl....................... F16k 31/165, F16k 1/22
[58] Field of Search....................... 251/58, 308, 305

[56] References Cited
UNITED STATES PATENTS
2,529,431  11/1950  Steins.................................... 251/58
3,298,286  1/1967  Tyler.................................. 251/58 X
1,603,455  10/1926  Dow.............................. 251/308 X
3,410,520  11/1968  Mahoney....................... 251/308 X FOREIGN PATENTS OR APPLICATIONS
753,104  7/1956  Great Britain..................... 251/308

Primary Examiner—Arnold Rosenthal
Attorney—David S. Fishman et al.

[57] ABSTRACT
A butterfly valve actuated by a piston rod end operating in a slot integral with the valve disc. The disc is supported for rotation by a pair of blind stub shafts.

1 Claim, 2 Drawing Figures

PATENTED NOV 13 1973 3,771,759

BUTTERFLY VALVE

BACKGROUND OF THE INVENTION

1. Field of the Invention

The present invention relates to controlling the flow of fluids and particularly hot gases. More specifically, this invention is directed to a valve particularly well suited for use in controlling the flow of hot gases. Accordingly, the general objects of the present invention are to provide novel and improved methods and apparatus of such character.

2. Description of the Prior Art

While not limited thereto in its utility, the present invention has been found to be particularly well suited for use in controlling the flow of heated gases through a conduit. Thus, apparatus in accordance with the invention may be employed as a hot air shut-off valve in environmental heating systems for vehicles such as trucks and buses. Apparatus in accordance with the invention may also be employed in a fuel de-icing system to control the flow of hot air utilized to preheat fuel delivered to an engine. Regardless of its manner of use, the present invention overcomes certain inherent disadvantages of prior art devices of like character.

In the prior art the conventional manner of exercising control over the flow of hot air cotemplated the use of a butterfly valve. To enable high temperature applications, the conventional butterfly valve was modified by being equipped with shaft seals, bearings and actuator seals which were capable of withstanding high temperatures and which were thus comparatively expensive accessories. The prior art butterfly valve, as used to control the flow of heated fluids, was accordingly a comparatively expensive, heavy and physically large device. High cost and expense and large size are all undesirable characteristics for many applications.

In addition to the above briefly discussed disadvantages of prior art butterfly valves designed for high temperature environments, it is to be noted that conventional butterfly valves, and particularly those which are fluid actuated, have a shaft mounted disc with the shaft extending outside of the valve bore. This arrangement requires the use of a rotary shaft seal at the valve disc thereby presenting a potential leakage path with the valve in the closed position. Also, the typical art valve has an operating lever or crank which is located outside of the valve bore and connected to the actuator shaft by means of a connecting rod or scotch-yoke mechanism. This arrangement increases the size of those portions of the valve mechanism positioned externally of the conduit or valve housing and for many applications this is a further disadvantage.

SUMMARY OF THE INVENTION

The present invention overcomes the above briefly discussed and other deficiencies and disadvantages of the prior art by providing a novel and improved method and apparatus for controlling the flow of fluid; the invention being particularly well suited for high temperature applications. In accordance with the invention, a butterfly type valve of samller size, weight and lower cost than prior art devices of similar character is provided.

Apparatus in accordance with the invention encompasses a unique drive and support for the disc of a butterfly valve wherein the valve crank is integrated into the butterfly disc. Thus, in accordance with the invention, the scotch-yoke mechanism employed to connect the actuator shaft to the valve disc is formed as a part of the disc and is located within the valve bore. The valve is actuated by a piston rod which operates in a slot in the scotch-yoke mechanism and the disc is supported by use of blind stub shafts thereby eliminating the need for a rotary seal in the valve. The primary seal ring about the periphery of the valve disc is preferably a spiral wound seal ring and thus constitutes a low cost standard commercial component which aids in the reduction of cost of the valve.

BRIEF DESCRIPTION OF THE DRAWING

The present invention may be better understood and its numerous objects and advantages will become apparent to those skilled in the art by reference to the accompanying drawing wherein like reference numerals refer to like elements in the two figures and in which.

DESCRIPTION OF THE PREFERRED EMBODIMNT

Figure 1:
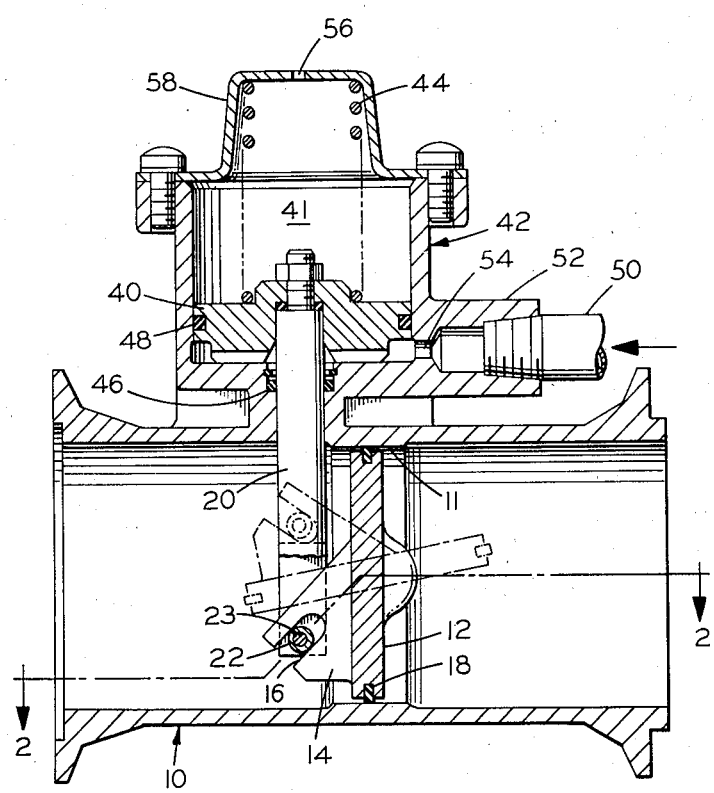
FIG. 1 is a cross-sectional side elevation view of a first embodiment of a valve in accordance with the present invention, the disc supporting elements having been eliminated from FIG. 1 in the interest of clarity.

With reference now to the drawing, it is to be observed that the disclosed embodiment is a single-acting, normally-closed pneumatic actuator. It is, however, to be understood that the present invention may be employed as a single-acting, normally-open or double-acting device for either pneumatic or hydraulic actuation and devices in accordance with the invention may be employed as either modulating or shut-off valves. The disclosed embodiment is employed to control the flow of heated fluid, typically hot air, in either direction through a valve body or conduit indicated generally at 10. In operation the valve element cooperates, in the manner to be descibed with a precision ground surface 11 on the interior of conduit 10.

Figure 2:
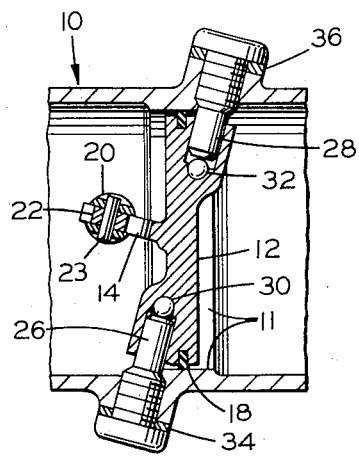
FIG 2 is a cross-sectional view taken along line 2—2 of the embodiment of FIG. 1, FIG. 2 depicting the shaft supporting elements of the disclosed embodiment.

The flow interrupting portion of the valve comprises a valve disc 12. The arm 14 of a scotch-yoke mechanism is formed integrally with disc 12 as may clearly be seen from joint cosideration of FIGS. 1 and 2. Arm 14 is provided with a slot 16 for the purposes to be described below. The disc 12 has a groove formed in its periphery and a spiral wound seal ring 18 is received in this groove. Seal ring 18 is ground on its outer diameter to provide effective sealing in the machined portion 11 of the bore of conduit 10. Seal ring 18 may, for example, comprise a commercially available retaining ring.

A piston rod 20 extends into conduit or valve body 10 and is provided, at its lower end, with a roller 22. Roller 22 engages the slot 16 in arm 14 and is typically affixed to the end of rod 20 by means of a pin 23. In the manner to be described below, and as will be obvious to those skilled in the art, reciprocation of rod 20 will cause the valve to be cycled by rotating disc 12; the fully closed position of the valve being shown in solid lines in FIG. 1 and the fully open position being shown by broken lines.

As noted above, the valve of the disclosed embodiment of the invention is actuated by a piston rod end operating in a slot in an arm integral with the valve disc.

This arrangement permits the use of blind stub shafts to support the disc thereby eliminating the need for any rotary seals in the valve. The supporting mechanisms have been omitted from FIG. 1 in the interest of clarity but may be seen clearly from FIG. 2. The valve disc 12 rotates about stub shafts 26 and 28 and is centered in the bore of the valve body or conduit 10 by means of the thrust balls 30 and 32 respectively associated with shafts 26 and 28. The thrust balls are located by means of shims 34 and 36 positioned under the outer shoulders of the stub shafts and the shims also serve as sealing gaskets.

Piston rod 20 extends out through the wall of body or conduit 10 and is connected to piston 40 disposed in a cylinder 41 defined by an actuator housing indicated generally at 42. In the disclosed embodiment the piston is biased toward the bottom of cylinder 41 by a return spring 44 whereby a normally closed valve is provided. A rod seal 46 is provided in the bottom of housing 42 about rod 20. The valve of the present invention wll be installed in such a manner to minimize the pressure across rod seal 46; i.e., typically with rod 20 located at the downstream side of the disc. Piston 40 is provided with a ring seal 48 in the coventional manner.

Operating pressure for the disclosed embodiment of the invention is applied to a first side of piston 40 via conduit 50, inlet connector portion 52 of housing 42 and a flow port 54 which communicates with the piston cylinder. The top of housing 42 is provided with a vent port 56 which provides communication between the interior of housing 42 at the second or upper side of piston 40 and the ambient atmosphere. Vent 56 will typically be formed in a removable cap portion 58 of housing 42.

In operation the valve disc 12 is rotated to the open position by the application of fluid pilot pressure to the actuator port 54 to overcome the return force of spring 44 and to thereby move the piston 40 upwardly. As piston 40 moves upwardly the valve disc rotates about stub shafts 26 and 28 while roller 22 on the end of piston rod 20 moves in slot 16 of arm 14. In a preferred embodiment conduit 50 extended between flow port 54 and the interior of conduit 10 upstream of the valve and a solenoid operated valve was installed in conduit 50. Accordingly, the present invention may operate in "bootstrap" fashion. Alternatively, a separate separated pressure supply may be employed for operation.

While a preferred embodiment has been shown and described, as noted above various modifications and substitutions may be made thereto without departing from the spirit and scope of the present invention. Accordingly, it is to be understood that the present invention has been described by way of illustration and not limitation.

What is claimed is:

1. A valve comprising:

housing means defining a linear fluid flow path therethrough;

a disc member, said disc member defining a substantially planar valve element, said disc member being provided with a pair of axially aligned bores, said bore axis intersecting a plane defined by the sealing portions of said disc member;

first and second stub shaft means, said shaft means extending through said housing means and respectively engaging one of said axially aligned bores in said disc member, said shaft means mounting said disc member for rotation about an axis, said axis of rotation of said disc member being intermediate the ends of said housing means defined flow path and generally transverse to the linear flow path;

arm means integral with and extending from said disc member, said arm means being oriented transversely to the axis of said aligned bores and being provided with a slot;

a piston rod extending through a wall of said housing means;

roller means mounted on said piston rod adjacent the first end thereof, said roller means engaging said arm means slot and moving therein during reciprocation of said piston rod whereby motion of said piston rod is transmitted to said arm means by said roller means;

an actuator housing mounted on the exterior of said valve housing means, said actuator housing defining a cylinder;

a piston disposed in said actuator housing cylinder;

means mechanically coupling the second end of said piston rod to said piston; and position.

means for imparting motion to said piston to thereby rotate said disc member to a desired potion.

* * * * *

UNITED STATES PATENT OFFICE
CERTIFICATE OF CORRECTION

PO-1050
(5/69)

Patent No. 3,771,759      Dated November 13, 1973

Inventor(s) James J. Pauquette

It is certified that error appears in the above-identified patent and that said Letters Patent are hereby corrected as shown below:

Column 3, line 47-Column 4, line 1, cancel "separated"

Column 4, line 44 (CLAIM 1), cancel "position"

Column 4, line 46 (CLAIM 1), change "potion" to --position--

Signed and sealed this 2nd day of April 1974.

(SEAL)
Attest:

EDWARD M. FLETCHER, JR.
Attesting Officer

C. MARSHALL DANN
Commissioner of Patents